US006668633B2

(12) United States Patent
Hart et al.

(10) Patent No.: US 6,668,633 B2
(45) Date of Patent: Dec. 30, 2003

(54) ELECTRONIC FUEL INJECTOR TESTER

(75) Inventors: George R. Hart, Brunswick, OH (US); Robert L. Bauman, Cleveland Heights, OH (US)

(73) Assignee: Hickok Incorporated, Cleveland, OH (US)

( * ) Notice: Subject to any disclaimer, the term of this patent is extended or adjusted under 35 U.S.C. 154(b) by 0 days.

(21) Appl. No.: 10/158,340

(22) Filed: May 31, 2002

(65) Prior Publication Data

US 2003/0221478 A1 Dec. 4, 2003

(51) Int. Cl.[7] .......... G01M 15/00
(52) U.S. Cl. .......... 73/119 A
(58) Field of Search .......... 73/119 A, 119 R, 73/116, 166, 655

(56) References Cited

U.S. PATENT DOCUMENTS 4,141,243 A 2/1979 Van Tassel et al.
4,520,773 A * 6/1985 Koslow .......... 123/198 A
4,523,458 A 6/1985 Daniel
4,712,421 A * 12/1987 Young .......... 73/119 A
4,841,765 A * 6/1989 Blanke .......... 73/119 A
5,000,043 A * 3/1991 Bunch et al. .......... 73/119 A
5,168,238 A * 12/1992 Larance .......... 324/556
5,809,446 A 9/1998 Visser
6,234,002 B1 * 5/2001 Sisney et al. .......... 73/1.57
6,260,412 B1 7/2001 Pool et al.

* cited by examiner

*Primary Examiner*—Eric S. McCall
(74) *Attorney, Agent, or Firm*—James A. Hudak

(57) ABSTRACT

An electronic fuel injector tester which permits fuel injectors to be tested when a car is at idle is disclosed. The fuel injector tester is in the form of a probe and detects the impact or vibration which occurs when the pintle within a fuel injector opens by using a piezoelectric transducer provided in the pistol-type handle of the tester. A light emitting diode provided in the pistol-type handle flashes each time the pintle within the fuel injector opens and the piezoelectric transducer emits an audible sound each time the pintle within the fuel injector opens. The fuel injector tester remains in the "sleep" mode when not in use and is activated by tapping the tester on a hard surface. When testing has been completed, the fuel injector tester automatically goes back into the "sleep" mode.

8 Claims, 4 Drawing Sheets

ELECTRONIC FUEL INJECTOR TESTER

TECHNICAL FIELD

The present invention relates, in general, to a tester for electronic fuel injectors, and, more particularly, to an electronic fuel injector testing probe that produces a visual and audible signal each time the pintle within the fuel injector being tested opens.

BACKGROUND ART

Testers to determine whether fuel injectors are operating properly are readily available. For example, U.S. Pat. No. 4,523,458 (Daniel) discloses a fuel injector tester which utilizes a piezoelectric crystal that converts mechanical impulses caused by the actuation of the pintle within the fuel injector into electrical signals. In this case, the piezoelectric crystal is comprised of two piezoelectric substrates with a metal layer interposed therebetween. The piezoelectric crystal is interposed between permanent magnets, one permanent magnet allowing the tester to be magnetically attached to the fuel injector being tested. The permanent magnets are provided with end plates which retain the piezoelectric crystal permitting the mechanical vibrations of the end plates, caused by the opening of the pintle within the fuel injector tester, to be transmitted to the piezoelectric crystal wherein the vibrations are converted into voltage signals. The resulting structure of the tester disclosed in this reference is rather complex since it includes two piezoelectric substrates with a metal layer interposed therebetween and also includes permanent magnets and end plates to retain the piezoelectric crystal and to transmit mechanical vibrations from the fuel injector to the piezoelectric crystal.

The Pool, et. al. reference (U.S. Pat. No. 6,260,412) discloses a device for testing the output control voltage of an electronic fuel injection system. The invention disclosed in this reference is directed to a device that can be used to test a fuel injection control system to determine if it is producing the necessary electrical signals required to actuate the fuel injectors. As such, the device disclosed in this reference cannot be used to test the operation of the fuel injectors individually.

The VanTassel, et. al. reference (U.S. Pat. No. 4,141,243) discloses apparatus for measuring the volumetric output of fuel injector system components, such as a fuel injector and/or a fuel pump. As such, by measuring the volumetric output of a fuel injector, a determination can be made as to whether the fuel injector is operating properly. In this case, the volumetric output of the fuel injector must be measured in order to evaluate the operability of the injector, and thus, a direct determination cannot be made as to whether the fuel injector is operating properly.

SUMMARY OF THE INVENTION

The present invention solves the problems associated with the prior art fuel injector testers, and other problems, by providing an electronic fuel injector testing probe which permits individual fuel injectors to be tested when the car is at idle. The fuel injector testing probe of the present invention detects the impact or vibration which occurs when the pintle within a fuel injector opens by using a piezoelectric transducer which is provided in the pistol-type handle of the probe. A light emitting diode is provided in the pistol-type handle and flashes each time the pintle within the fuel injector opens. In addition, the testing probe emits an audible sound each time the pintle within the fuel injector opens.

The electronic fuel injector testing probe of the present invention remains in the "sleep" mode when not in use. The testing probe is activated by tapping the probe on a hard surface. Once the testing probe is "awakened", the light emitting diode flashes and the probe emits an audible sound. The tip of the testing probe can then be placed against the body of the fuel injector being tested to determine whether the fuel injector is operating properly. Opening of the pintle within the fuel injector causes both the light emitting diode within the pistol-type handle of the testing probe to flash and the probe to emit an audible sound. When testing has been completed, the fuel injector testing probe emits an audible sound, flashes and then goes back into the "sleep" mode.

DESCRIPTION OF THE PREFERRED EMBODIMENT

Figure 1:
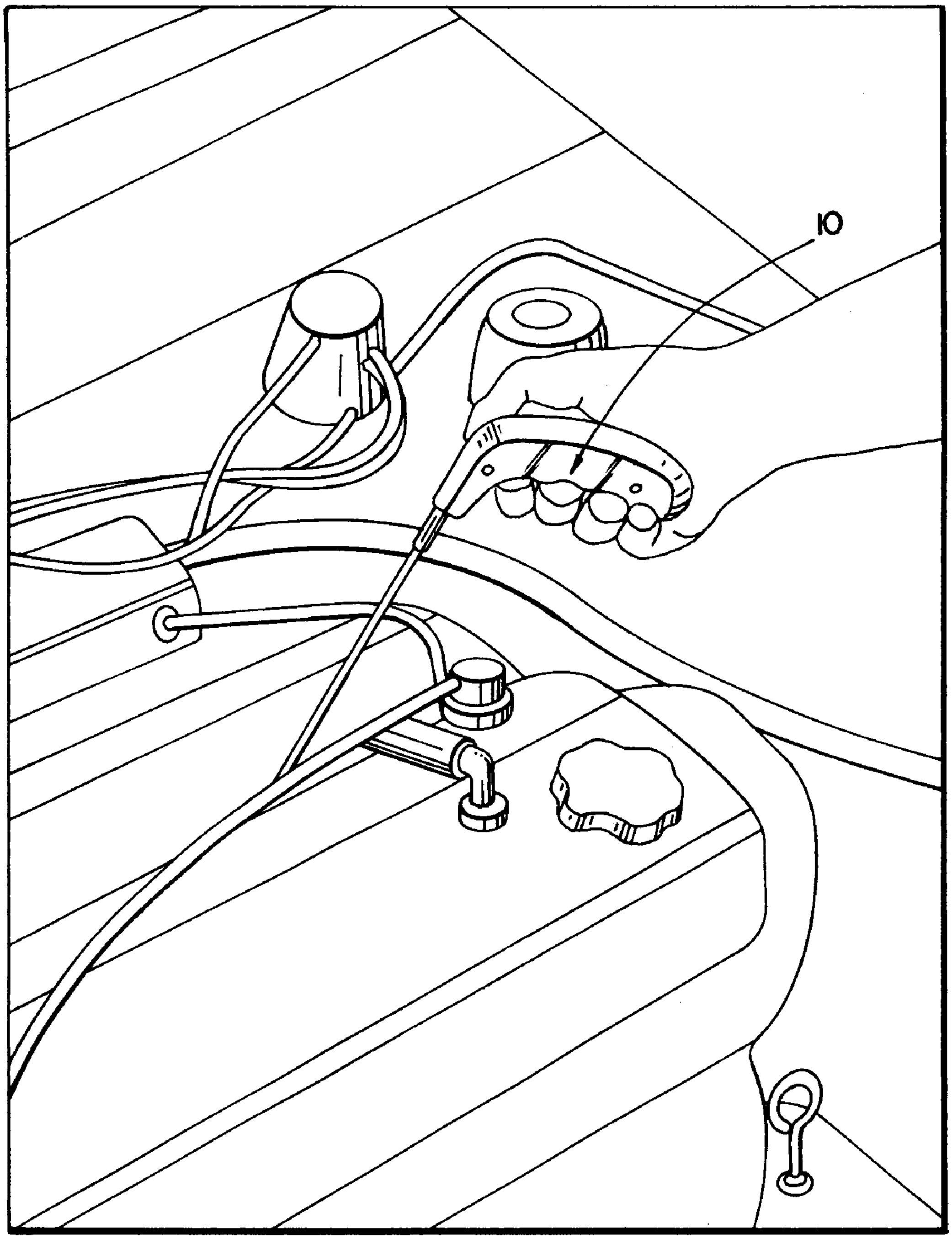
FIG. 1 is a perspective view of the electronic fuel injector testing device of the present invention and illustrates the placement of the end of the testing probe against the fuel injector being tested.
Figure 2:
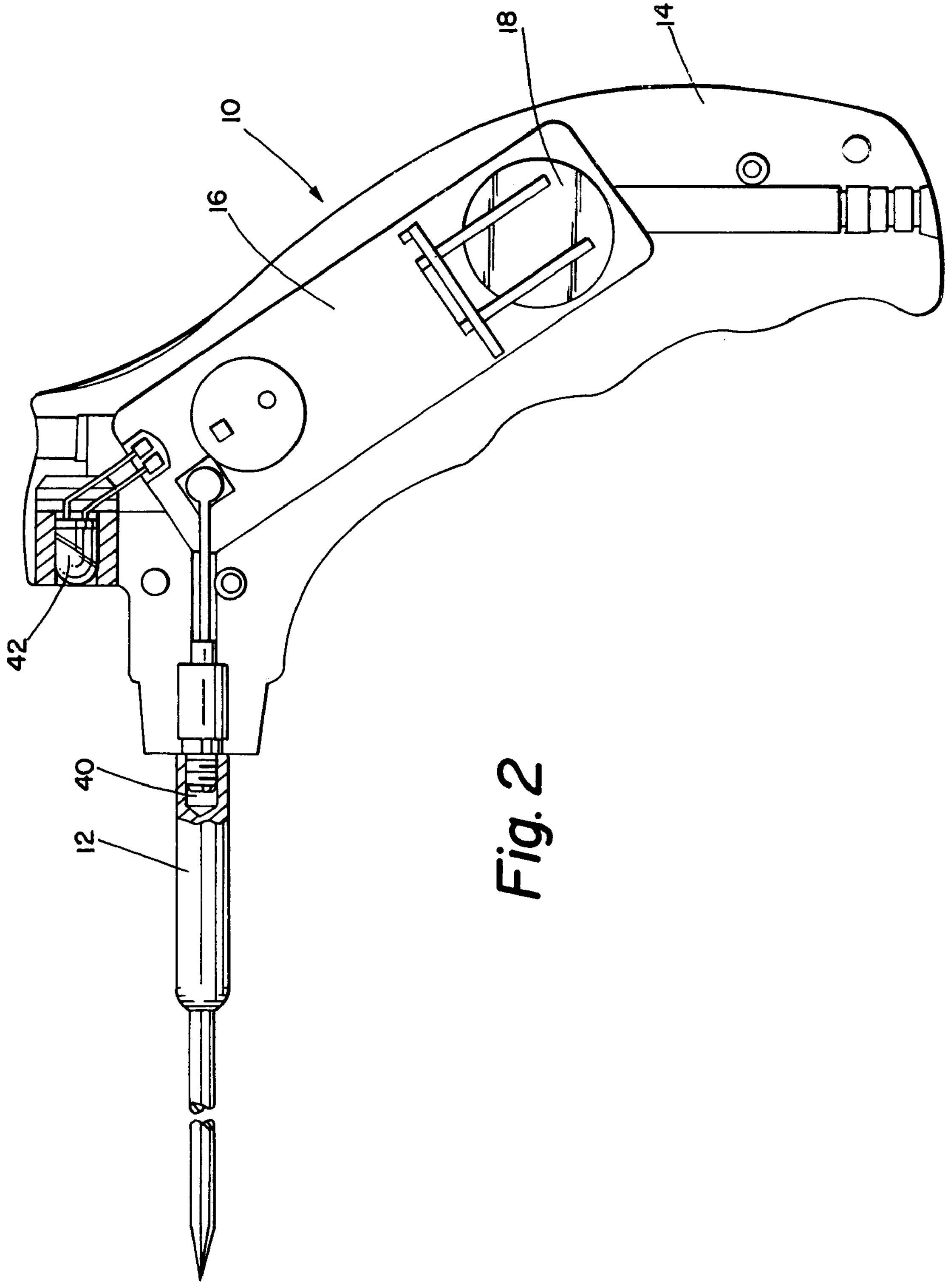
FIG. 2 is an elevational view, partially broken away in cross-section, of the electronic fuel injector testing device of the present invention.

Referring now to the drawings where the figures illustrate the preferred embodiment of the present invention, and are not intended to limit the invention described herein, FIG. 1 is a perspective view of the electronic fuel injector tester 10 of the present invention and illustrates the placement of the end of the probe portion of the tester 10 against a fuel injector being tested. FIG. 2 is an elevational view, partially broken away in cross-section, of the electronic fuel injector tester 10 of the present invention. The fuel injector tester 10 is comprised of a probe tip 12 and a pistol grip handle 14 which includes the electronic circuitry 16 and a battery 18 used as the power source for the tester 10.

Figure 3:
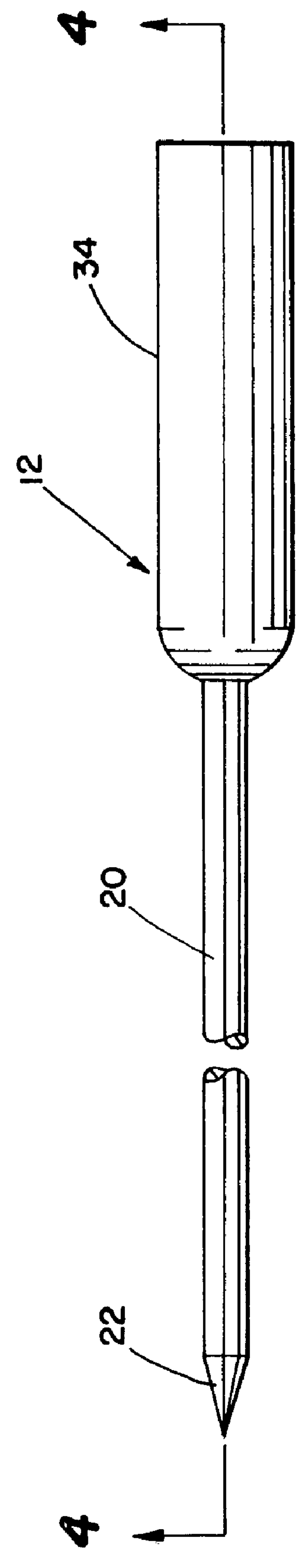
FIG. 3 is an elevational view of the probe portion of the electronic fuel injector testing device of the present invention.
Figure 4:
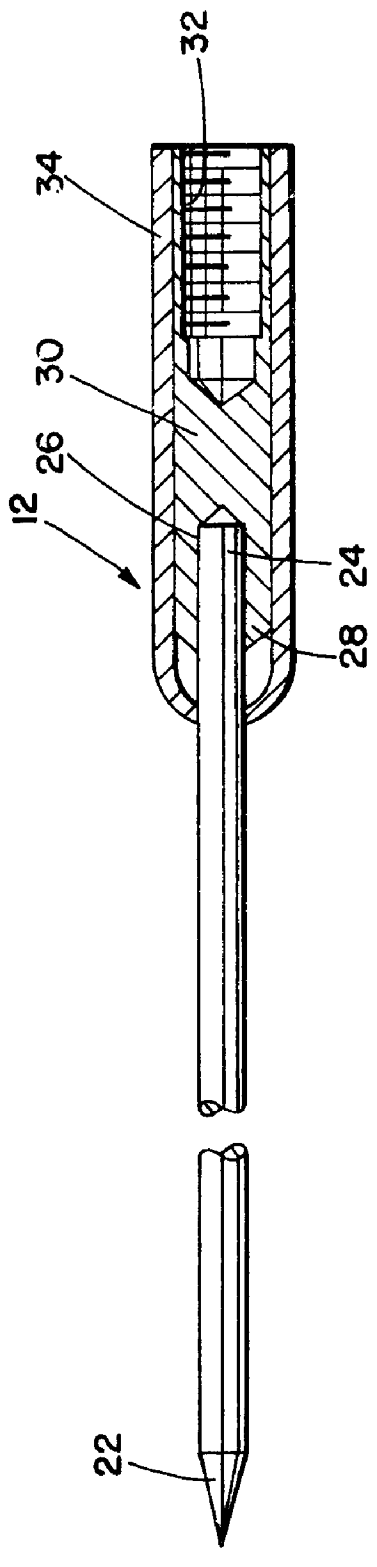
FIG. 4 is a cross-sectional view taken across section-indicating lines 4—4 in FIG. 3.

As shown in FIGS. 3 and 4, the probe tip 12 is comprised of a metallic probe having a point 22 at one end thereof. The other end 24 of the probe 20 is press fit within a blind bore 26 in one end 28 of a metallic hub member 30. The other end of hub member 30 has a threaded blind bore 32 therein. The metallic hub member 30 provides mechanical conductivity, i.e., transmits vibrations, from the metallic probe 20 to the pistol grip handle 14. A non-metallic sleeve 34 is received over hub member 30.

As shown in FIG. 2, the pistol grip handle 14 includes a metallic male threaded portion 40 which is received within threaded blind bore 32 in hub member 30 of probe tip 12. A light emitting diode 42 is provided within pistol grip handle 14 adjacent to the male threaded portion 40.

Figure 5:
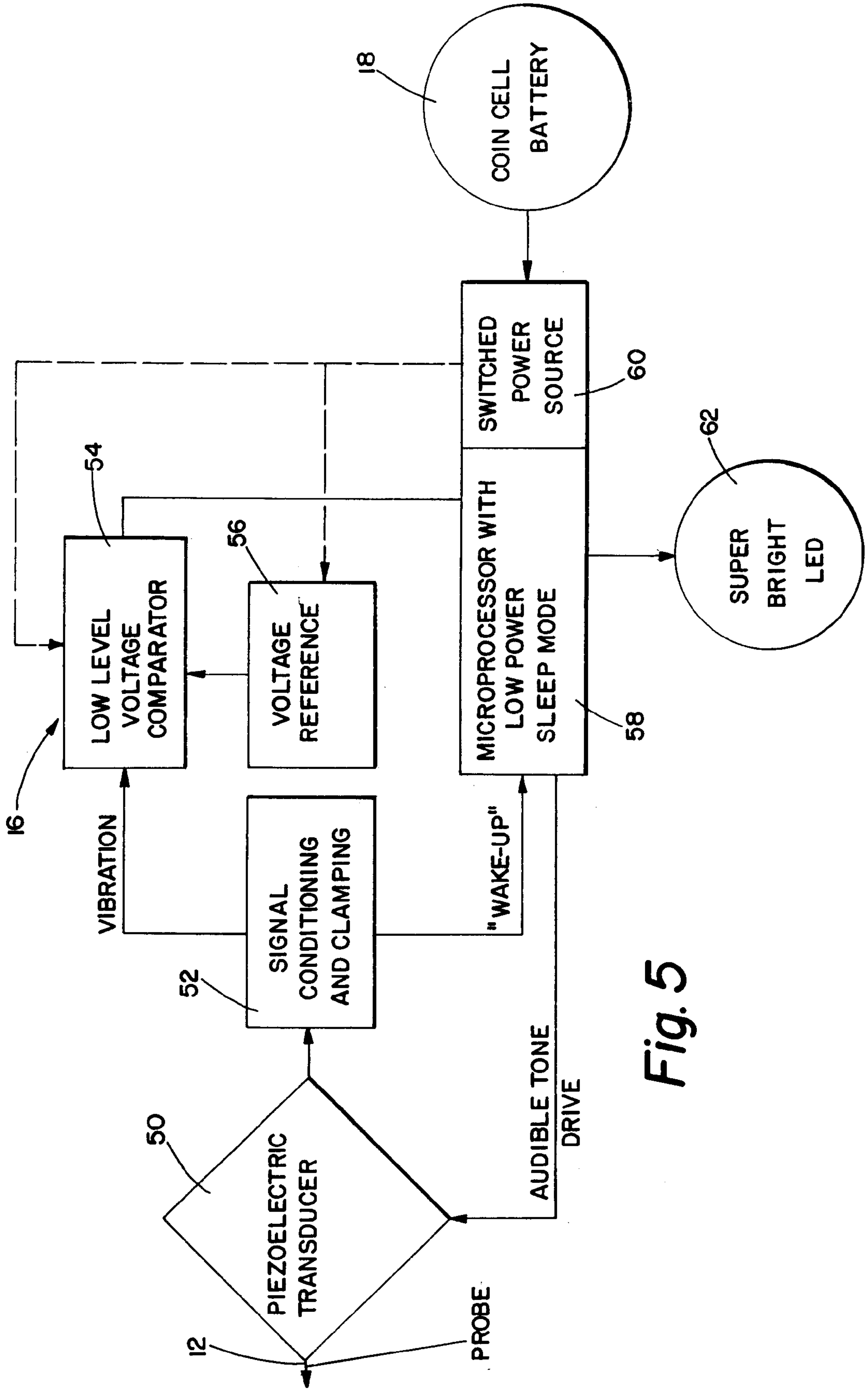
FIG. 5 is a schematic diagram of the electronic circuitry utilized by the electronic fuel injector testing device of the present invention.

Referring now to FIG. 5, a schematic diagram of the electronic circuitry 16 utilized by the fuel injector tester 10 is illustrated. The electronic circuitry 16, which is received within the pistol grip handle 14 of the tester 10, includes a piezoelectric transducer 50, a signal conditioning and clamping circuit 52, a low voltage comparator 54, a voltage reference 56, and a microprocessor 58 having a switched power source 60 therein. The probe tip 12 is mechanically connected to the input to the piezoelectric transducer 50 whose output is connected to the input to the signal conditioning and clamping circuit 52. One output of the signal conditioning and clamping circuit 52 is connected to an input to the low voltage comparator 54. The other output of the signal conditioning and clamping circuit 52 is connected to an input to the microprocessor 58. Battery 18 is connected to the input to the switched power source 60 which provides power to the microprocessor 58, the voltage reference 56 and the low voltage comparator 54. The output of the voltage reference 56 is applied as an input to the low voltage comparator 54. The output of the low voltage comparator 54 is applied as an input to the microprocessor 58. The output of the microprocessor 58 is connected to a super bright light emitting diode 62.

Operationally, the fuel injector tester 10 is in the "sleep" mode when not in use. In order to use the tester 10, the tester 10 is tapped on a hard surface causing the piezoelectric transducer 50 to generate an output voltage which is processed by signal conditioning and clamping circuit 52 and applied as an input to microprocessor 58 causing switched power source 60 to be actuated applying power to the reference voltage 56 and the low voltage comparator 54. Actuation of switched power source 60 also causes the piezoelectric transducer 50 to emit an audible beeping sound and causes the light emitting diode 62 to flash. The probe tip 12 is then placed against the body of the fuel injector (not shown) being tested and each time the pintle within the fuel injector snaps open, the vibration from the opening of the pintle causes the piezoelectric transducer 50 to generate an output voltage which is processed by signal conditioning and clamping circuit 52 and applied as an input to the low voltage comparator 54. If the voltage produced by the piezoelectric transducer 50 exceeds the reference voltage, such as 30 mv, set by voltage reference 56, the voltage comparator 54 produces an output voltage which is applied as an input to the microprocessor 58 which, in turn, causes the light emitting diode 62 to flash and causes the piezoelectric transducer 50 to emit an audible beeping sound. If the voltage comparator 54 does not produce an output signal for a pre-determined period of time, such as 40 seconds, the microprocessor 58 causes the piezoelectric transducer 50 to emit an audible beeping sound and causes the light emitting diode 62 to flash. The microprocessor 58 then causes the tester 10 to automatically turn off, i.e., it causes the tester 10 to go back into the "sleep" mode.

Consistent steady flashing of the light emitting diode 62 and the simultaneous emission of audible beeping sounds from the piezoelectric transducer 50 indicates that the fuel injector being tested is operating properly. No response or an inconsistent response from the fuel injector tester 10 indicates that the fuel injector being tested is not firing or is firing intermittently. Such a condition can be caused by the fuel injector being mechanically stuck. Alternatively, an electrical open or short might be present in the fuel injector or an electrical fault might exist in the electrical harness or control module for the fuel injector.

Certain modifications and improvements will occur to those skilled in the art upon reading the foregoing. It is understood that all such modifications and improvements have been deleted herein for the sake of conciseness and readability, but are properly within the scope of the following claims.

We claim:

1. A fuel injector testing device comprising a handle portion, a probe portion attached to said handle portion, said probe portion being placeable on the fuel injector to be tested to detect vibrations within the fuel injector, a piezoelectric transducer receivable within said handle portion and connected to said probe portion, said piezoelectric transducer being operable to convert said vibrations detected by said probe portion into an output voltage, a reference voltage, means for comparing said output voltage with said reference voltage, said voltage comparing means producing an output signal when said output voltage exceeds said reference voltage, and a source of power for said testing device; said reference voltage, said voltage comparing means and said power source being receivable within said handle portion of said testing device.

2. The testing device as defined in claim 1 further including means for conditioning said output voltage produced by said piezoelectric transducer, said output voltage conditioning means being receivable within said handle portion of said testing device and being operable to produce an input signal to said voltage comparing means.

3. The testing device as defined in claim 1 further including microprocessing means, said microprocessing means being receivable within said handle portion of said testing device and being operable to convert said output signal produced by said voltage comparing means into a signal indicating that said probe portion is detecting vibrations within the fuel injector being tested.

4. The testing device as defined in claim 3 further including a light emitting diode within said handle portion of said testing device, said microprocessing means causing the illumination of said light emitting diode in response to the receipt of said output signal produced by said voltage comparing means.

5. The testing device as defined in claim 3 wherein said microprocessing means causes said testing device to emit an audible signal in response to the receipt of said output signal produced by said voltage comparing means.

6. The testing device as defined in claim 5 wherein said audible signal is emitted by said piezoelectric transducer.

7. The testing device as defined in claim 1 wherein said power source is activated by subjecting said testing device to a mechanical shock.

8. The testing device as defined in claim 3 wherein said microprocessing means causes said power source to deactuate said testing device if said microprocessing means does not receive an output signal from said voltage comparing means for a predetermined period of time.

* * * * *